US006695084B2

(12) United States Patent
Wilk

(10) Patent No.: US 6,695,084 B2
(45) Date of Patent: Feb. 24, 2004

(54) PERSONAL HOVERCRAFT WITH STAIRWAY CLIMBING

(76) Inventor: Peter J. Wilk, 160 Third Ave., New York, NY (US) 10003

( * ) Notice: Subject to any disclaimer, the term of this patent is extended or adjusted under 35 U.S.C. 154(b) by 0 days.

(21) Appl. No.: 10/073,376

(22) Filed: Feb. 11, 2002

(65) Prior Publication Data

US 2002/0112908 A1 Aug. 22, 2002

Related U.S. Application Data

(60) Provisional application No. 60/270,507, filed on Feb. 22, 2001.

(51) Int. Cl.[7] .......................... B60V 1/00; B62D 57/032

(52) U.S. Cl. ........................ 180/117; 180/126; 180/8.2; 180/8.6

(58) Field of Search ................................ 180/116, 117, 180/119, 122, 124, 125, 126, 129, 8.2, 8.1, 8.5, 8.6, 9.32; 901/1; 280/5.2, 5.26, 5.28, 5.3, 5.32, DIG. 10

(56) References Cited

U.S. PATENT DOCUMENTS

| | | | | | |
|---|---|---|---|---|---|
| 3,207,245 | A | * | 9/1965 | Weiland | |
| 3,263,764 | A | * | 8/1966 | Bertin | |
| 3,267,882 | A | * | 8/1966 | Rapson et al. | |
| 3,463,146 | A | * | 8/1969 | Schwartz et al. | |
| 4,569,409 | A | * | 2/1986 | Kluth | 180/8.2 |
| 4,843,969 | A | * | 7/1989 | Chaffee et al. | 180/121 |
| 4,915,184 | A | * | 4/1990 | Watkins | 180/8.2 |
| 5,377,775 | A | * | 1/1995 | Rush | 180/116 |
| 5,575,346 | A | * | 11/1996 | Yberle | 180/8.6 |
| 5,676,215 | A | | 10/1997 | Misawa | |
| 5,701,965 | A | | 12/1997 | Kamen et al. | |
| 5,769,759 | A | | 6/1998 | Alter et al. | |
| 5,833,248 | A | | 11/1998 | Eguchi | |
| 6,318,488 | B1 | * | 11/2001 | Smith | 180/119 |
| 6,341,784 | B1 | * | 1/2002 | Carstens | 180/8.2 |

FOREIGN PATENT DOCUMENTS

| | | | | |
|---|---|---|---|---|
| FR | 2607093 | * | 11/1986 | |
| JP | 149276 | * | 6/1988 | 180/8.2 |
| JP | 2-3577 | * | 2/1990 | |
| SU | 1587165 | * | 8/1990 | 180/8.6 |

OTHER PUBLICATIONS

"New Ford Vehicle Rides on Air", Iron Age Magazine, Apr. 3, 1958, pp. 68–71.*

* cited by examiner

*Primary Examiner*—Anne Marie Boehler
(74) *Attorney, Agent, or Firm*—R. Neil Sudol; Henry Coleman; William Sapone

(57) ABSTRACT

A personal transportation apparatus has a frame defining a surface for supporting a load, and a plurality of air-cushion cells mounted to the frame and depending from a lower side thereof, the air-cushion cells each having a changeable height to accommodate variations in an underlying terrain during a translation of the frame over the terrain. A pressure source is mounted to the frame and is operatively connected to the air-cushion cells for supplying air under pressure to the cells, thereby generating an air-cushion support for the frame. An elevation mechanism is mounted to the frame for lifting the frame from one step to a next higher step of a stairway so that the frame ascends the stairway from a lowermost step to an uppermost step of the stairway.

9 Claims, 4 Drawing Sheets

PERSONAL HOVERCRAFT WITH STAIRWAY CLIMBING

CROSS REFERENCE TO RELATED APPLICATION

This application claims priority from provisional application No. 60/270,507, filed on Feb. 22, 2001.

BACKGROUND OF THE INVENTION

This invention relates to a transportation device or vehicle. More particularly, this invention relates to a transportation vehicle of the hovercraft type.

Vehicles are known wherein the body of the vehicle is spaced from an underlying surface by a cushion of pressurized air. The air cushion is maintained in part by a downwardly depending skirt usually made of a flexible rubber material. Known hovercraft are not capable of climbing stairways.

OBJECTS OF THE INVENTION

An object of the present invention is to provide a hovercraft type vehicle.

Another object of the present invention is to provide a hovercraft type vehicle which is capable of traveling over uneven terrain or floor surfaces.

A further object of the present invention is to provide a hover-type transport method.

A more specific object of the present invention is to provide a hovercraft-type apparatus and/or an associated method wherein a load is transported up a multiple-step stairway.

These and other objects of the present invention will be apparent from the drawings and descriptions hereof. It is to be noted that each object of the present invention is attained by at least one embodiment of the present invention. No embodiment necessarily meets every object of the invention.

SUMMARY OF THE INVENTION

A personal transportation apparatus comprises, in accordance with the present invention, a frame defining a surface for supporting a load, and a plurality of air-cushion cells mounted to the frame and depending from a lower side thereof, the air-cushion cells each having a changeable height to accommodate variations in an underlying terrain during a translation of the frame over the terrain. The apparatus also comprises a pressure source mounted to the frame and operatively connected to the air-cushion cells for supplying air under pressure to the cells, thereby generating an air-cushion support for the frame. An elevation mechanism is mounted to the frame for lifting the frame from one step to a next higher step of a stairway so that the frame ascends the stairway from a lowermost step to an uppermost step of the stairway.

In at least one embodiment of the invention, the elevation mechanism is separate from the air-cushion cells. More particularly, the elevation mechanism includes a plurality of mechanical parts different from components of the air-cushion cells. For example, the elevation mechanism may include at least two extensible leg members mounted to the lower side of the frame. The leg members may be pivotably mounted to the lower side of the frame.

Pursuant to another feature of the present invention, the elevation mechanism includes at least one drive operatively connected to the leg members for extending the leg members to lift the frame from the one step to the next higher step. Sensors are provided on the frame for monitoring a distance of the frame from an underlying surface, while a control unit is operatively connected to the sensors and the drive for operating the drive in response to detection of the step by the sensors. The sensors may specifically include a plurality of ultrasonic sensors. In that case, the elevation mechanism further includes an ultrasonic signal generator mounted to the frame for producing an airborne ultrasonic wave and directing the wave towards the underlying surface.

The drive may include a linear drive for alternately lengthening and shortening the leg members and a rotary drive for periodically pivoting the leg members during a stairway climbing process.

Where the extensible leg members are a first pair of leg members, the elevation mechanism includes at least one second pair of extensible leg members mounted to the frame on the lower side thereof, for supporting the frame on the next higher step upon a lifting of the frame by the first pair of leg members from the one step to a position over the next higher step.

In accordance with another feature of the present invention, the air-cushion cells include respective rigid telescoping tubes extendible to varying distances from the lower side of the frame, while the elevation mechanism includes a drive operatively connected to the tubes for alternately extending and retracting the tubes. The tubes are each provided at a lower end with a resilient skirt serving as a flexible seal member.

Optionally, the elevation mechanism includes a pneumatic drive, the pressure source being operatively connected to the drive for operating same.

A personal transportation method comprises, in accordance with the present invention, providing a vehicle having a support surface, placing a load on the support surface, thereafter generating an air cushion between the vehicle and an underlying surface, and exerting a motive force on the vehicle during air cushion generation to move the vehicle generally horizontally over the underlying surface towards a lowermost step of a multiple-step stairway. Upon reaching the lowermost step by the vehicle, an elevation mechanism on the vehicle is operated to lift the vehicle step by step from the lowermost step to an uppermost step of the stairway. Thereafter, the air cushion is again generated between the vehicle and a floor surface extending from the uppermost step, during which time another motive force is exerted on the vehicle to move the vehicle generally horizontally over the floor surface and away from the stairway.

In accordance with further aspects of the present invention, the generating of the air cushion both at the bottom and the top of the stairway includes feeding air under pressure to a plurality of air-cushion cells on a lower side of the vehicle, heights of the air-cushion cells being changed during the lifting of the vehicle up the stairway.

The operating of the elevation mechanism may include alternately extending and collapsing and periodically pivoting at least two extensible leg members mounted to the lower side of the vehicle. More specifically, where the air-cushion cells include respective rigid telescoping tubes extendible to varying distances from the lower side of the frame, the operating of the elevation mechanism includes alternately extending and retracting the tubes.

Pursuant to a further feature of the present invention, the method further comprises automatically monitoring distances of the vehicle from the underlying surface and surfaces of the stairway and operating the elevation mechanism in response to detection of the lowermost step.

A hovercraft type vehicle in accordance with the present invention travels over ground and floor surfaces and ascends stairways. The apparatus is capable of ascending conventional stairways with steps each having a width less than approximately eighteen inches or forty-six centimeters, the width being measured along a dimension extending perpendicularly between a leading edge of the respective step and an adjacent higher step.

DETAILED DESCRIPTION OF THE DRAWINGS AND OF PREFERRED EMBODIMENTS OF THE INVENTION

Figure 1:
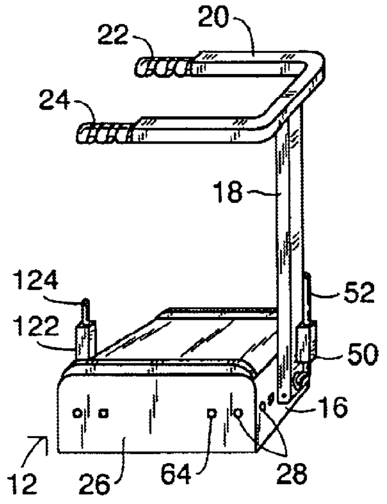
FIG. 1 is a schematic front, top, and side perspective view of a stair climbing personal hovercraft in accordance with the present invention.
Figure 2:
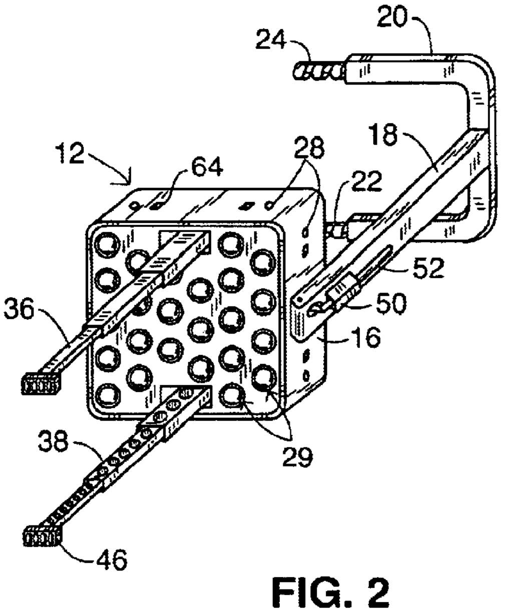
FIG. 2 is a schematic front, bottom, and side perspective view of the personal hovercraft vehicle of FIG. 1.

As illustrated in FIGS. 1 and 2, a personal hovercraft or air-cushion vehicle comprises a frame or platform 12 having a load-bearing upper surface 14 and provided along a front wall or panel 16 with a post or upright 18 carrying a U-shaped handle bar 20. Handle bar 20 is provided at free ends with a pair of hand grips 22 and 24 and carries a plurality of manually operable controls (see FIG. 4). Foot controls (not shown) may also be provided on upper surface 14 of frame or platform 12, for instance, at a base of post or upright 18.

Front panel 16 and lateral walls or panels 26 of frame or platform 12 may be provided with sensors 28 for enabling an automatic monitoring of distances between the personal hovercraft or air-cushion vehicle and various environmental surfaces, such as a ground or floor surface and vertical surfaces such as walls and stair steps. Sensors 28 may take any suitable form including ultrasonic pressure wave detectors.

Mounted to a lower side 27 of platform 12 is a plurality of telescoping tube assemblies 29 each including a rigid outer tube 30 and at least one rigid inner tube 32 slidably disposed inside the respective outer tube 30. At their free lower ends, inner tubes 32 each carry a resilient skirt 34, for instance, in the form of a plurality of interconnected rubber rings 36. Skirts 34 serve as flexible seal members which are placed into effectively air tight engagement with an underlying surface to thereby enable the pressurization of tube assemblies 28 during operation of the personal hovercraft or air-cushion vehicle.

Figure 3:
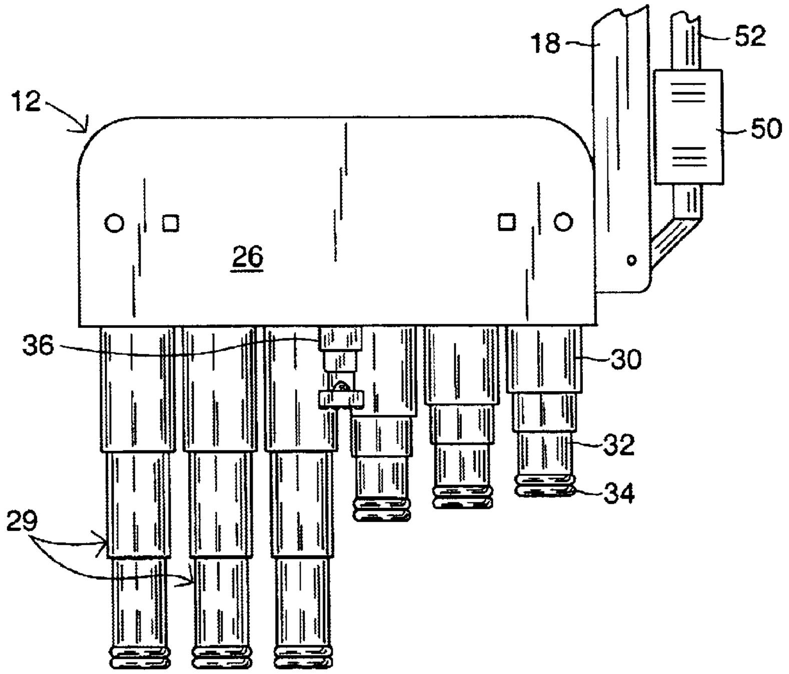
FIG. 3 is a partial side elevational view of the personal hovercraft vehicle of FIGS. 1 and 2, showing the vehicle in a configuration used during a stair climbing process in accordance with the present invention.

As depicted in FIGS. 2 and 3, platform 12 is further provided on lower side 27 with a pair of legs 36 and 38 each including a plurality of rigid members 40, 42, 44 telescopingly inserted or otherwise slidably connected to one another. At their lower or free ends, legs 36 and 38 are each provided with a pivotably mounted foot 46 preferably provided on a lower side with a rubber gripping layer (not shown). Legs 36 and 38 are themselves pivotably attached to platform 12 at pivot pins or hinged joints 48.

As illustrated in FIGS. 1–3, the personal hovercraft or air-cushion vehicle is optionally provided at the front side with a counterbalance weight 50. Weight 50 is movably mounted to frame or platform 12 for use in automatically counterbalancing a user's weight, for example, when the user is not properly positioned (see FIG. 5) for negotiating a stairway. Weight 50 is mounted to a rod or tube 52 which is pivotably fixed at a lower end 54 to platform 12. Weight 50 is slidable along rod or tube 52 to vary a moment arm of the weight relative to platform 12. Rod or tube 52 may be alternately extendible and collapsible, e.g., of a telescoping design.

Figure 4:
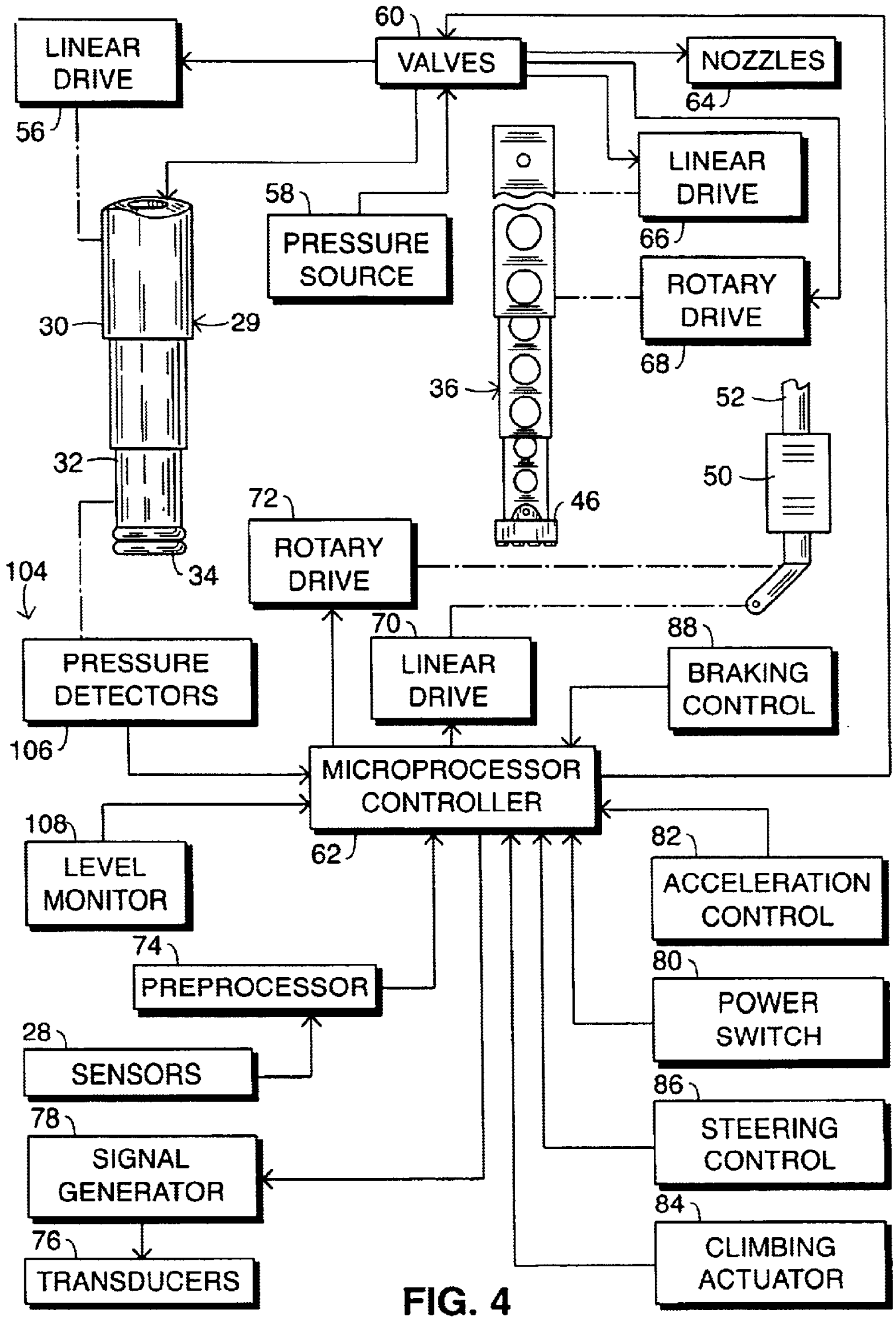
FIG. 4 is a block diagram of operational components of the personal hovercraft vehicle of FIGS. 1–3.

FIG. 4 shows various functional components of the personal hovercraft or air-cushion vehicle. Tube assemblies 29 are operatively coupled to respective reversible linear drives 56 which function to alternately extend inner tubes 32 from outer tubes 30 and retract the inner tubes 34 back into the outer tubes 30. Drives 56 also function to shift the entire tube assemblies 29 alternately into and out of platform 12.

Tube assemblies 29 are also operatively connected to a pressure source 58 such as an air compressor via a bank of valves 60. Valves 60 are operated by a microprocessor controller 62. Pressure source 58 may also be selectively placed in communication with a set of nozzles 64 for providing a jet-type motive force or propulsion to the personal hovercraft or air-cushion vehicle. Other kinds of propulsion are also feasible, such alternative sources of propulsion including manual power (pushing) and wheel traction (not shown).

Legs 36 and 38 are operatively linked to at least one reversible linear drive 66 which serves to alternately extend and collapse the legs in response to signals from microprocessor controller 62. Legs 36 and 38 are additionally coupled to at least one rotary drive 68 which swings legs 36 and 38 in alternate directions about their pivots 48 in response to signals from microprocessor controller 62.

Rod or tube 52 is in operative engagement with a linear drive 70 and a rotary drive 72 which are linked to microprocessor controller 62. In response to signals from controller 62, drives 70 and 72 adjust the position of weight 50 along rod or tube 52, as well as the angle of the rod or tube relative to the vertical. In this manner, the counterbalancing effect of weight 50 may be altered to compensate for shifts in load position particularly during negotiation of a stairway.

FIG. 4 also shows sensors 28 coupled at an output to a signal preprocessor 74 which performs preliminary data processing on incoming ultrasonic frequency signals to assist signal interpretation by microprocessor controller 62. Sensors 28 detect ultrasonic pressure waves which are produced in the ambient air by electroacoustic transducers 76 on platform 12 in response to electrical waveforms from a signal generator 78. The ultrasonic pressure waves detected by sensors 28 are reflected from various ground, floor, wall, and stairway surfaces. Signal preprocessor 74 and microprocessor controller 62 interpret the received reflected signals to determine distances of the personal hovercraft or air-cushion vehicle from nearby ground, floor, wall, and stairway surfaces. This information is used in part by microprocessor controller 62 to synchronize the operations of drives 56, 66, 68, 70 and 72 with each other and with the operation of valves 60 to effectuate an ascent or descent of a stairway, as discussed in detail hereinafter with reference to FIGS. 6A et seq. and 7A et seq. Of course, platform 12 carries a power source (not shown) for energizing pressure source 58, valves 60, and drives 56, 66, 68, 70, 72, etc.

FIG. 4 additionally depicts a power switch 80, an accelerator control 82, a stair climbing actuator 84, a steering control 86, and a braking control 88. Switch 80, actuator 84, and controls 82, 86, and 88 may be located on handle bar 20 and are operatively connected to microprocessor controller 62. In response to signals from controls 82, 86, and 88, microprocessor controller 82 may operate valves 60 to selectively activate jet nozzles 64 and/or other propulsion components (not shown) such as a powered wheel and a brake operatively coupled thereto.

Figure 5:
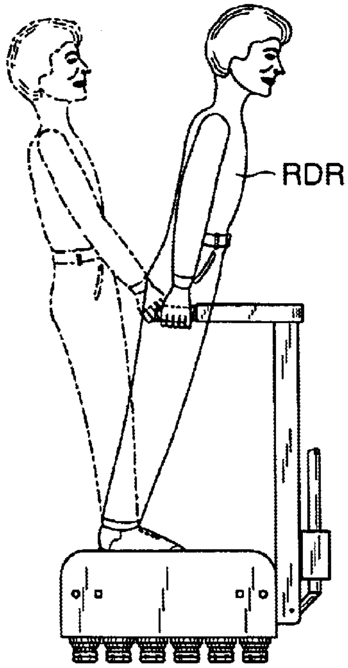
FIG. 5 is a schematic side elevational view of the personal hovercraft vehicle of FIGS. 1–3, showing a preferred user orientation during a stair climbing process in accordance with the present invention.

FIG. 5 shows a preferred orientation of a rider RDR during a climbing of a stairway by the personal hovercraft or air-cushion vehicle. Rider RDR leans forward into handle bar 20, to ensure that the center of gravity remains over a forward half of platform 12 during the stairway climbing process. During descent of a stairway by rider RDR on the personal hovercraft or air-cushion vehicle, the rider leans in the opposite direction, towards the rear of platform 12, as indicated in phantom lines 89.

Figure 6A:
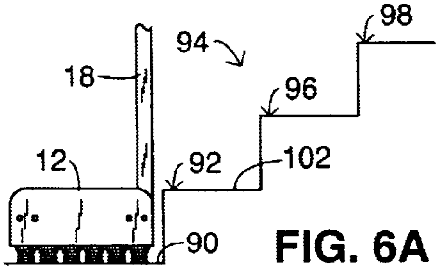
FIGS. 6A through 6G are diagrammatic partial side elevational views of the personal hovercraft vehicle of FIGS. 1–3, showing successive steps in a stair climbing process in accordance with the present invention.
Figure 6B:
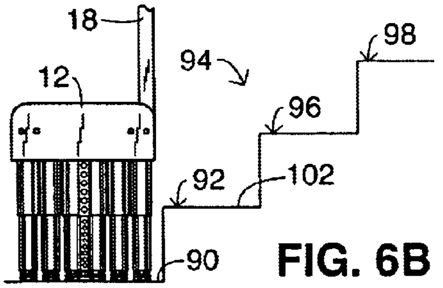
Figure 6C:
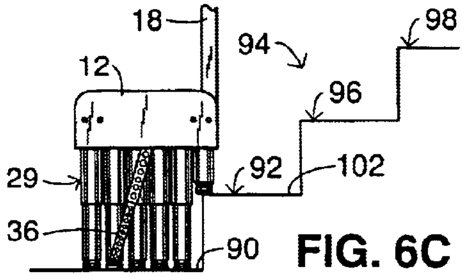
Figure 6D:
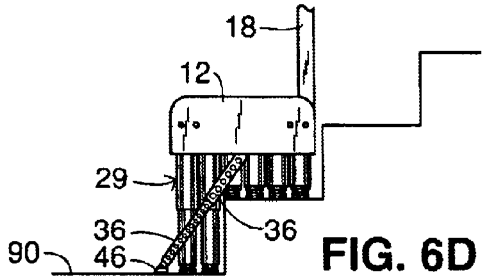

FIG. 6A shows platform 12 located on a floor surface 90 proximately to a lowermost step 92 of a stairway 94 having a second step 96, a third step 98, etc. Stair steps 92, 96, 98, etc., have dimensions within conventional ranges for steps found in buildings. For instance, steps 92, 96, 98 have a width (perpendicular to step edge) of less than eighteen inches and more likely less than about twelve inches. Either in response to a signal from actuator 84 or automatically in response to a detection of an approaching stairway 94, microprocessor controller 62 activates linear drive 56 to induce an extension of tube assemblies 29 from a collapsed configuration shown in FIG. 6A to an extended configuration shown in FIG. 6B. In the extended configuration of FIG. 6B, a lower side 100 of platform 12 is disposed at a higher level than an upper surface 102 of lowermost step 92. In a subsequent step, microprocessor controller 62 activates linear drive(s) 66 to lengthen legs 36 and 38 from a retracted storage condition (FIG. 6B) to an extended use configuration also shown in FIG. 6B. After the extension of legs 36 and 38 so that feet 46 rest on floor surface 90, microprocessor controller 62 selectively energizes linear drives 56 of a forwardmost row 110 of tube assemblies 29 to retract those tube assemblies, as shown in FIG. 6C. At that juncture, microprocessor controller 62 activates rotary drive(s) 68 to tilt legs 36 and 38 to shift platform 12 towards second step 96 so that a forwardmost portion of the platform is disposed over step 92, as shown in FIG. 6C. Linear drive 66 is also activated during this tilting process to maintain platform 12 at the same horizontal level. As legs 36 and 38 tilt forward to an increasing extent, additional rows of tube assemblies 29, starting from the front and moving back, are successively retracted, until a forward half of platform 12 is located over step surface 102, as shown in FIG. 6D. After the shifting of platform 12, linear drives 66 are energized by microprocessor controller 62 to retract legs 36 and 38 into platform 12. Rotary drives 68 may be activated subsequently to return the retracted or collapsed legs 36 and 38 to a vertical storage orientation (not shown).

Figure 6E:
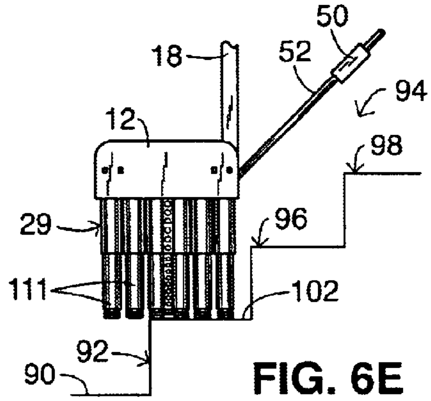
Figure 6F:
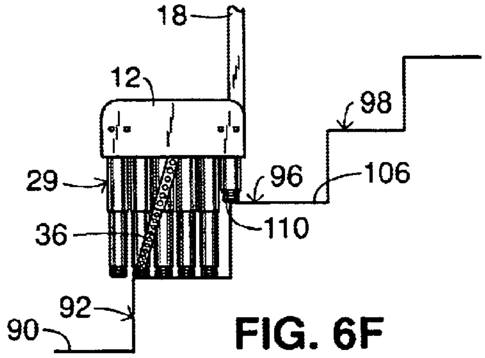

After the retraction of legs 36 and 38 into platform 12, the linear drives 56 of the forward set 110 of tube assemblies 29 are energized by microprocessor controller 62 to extend tubes 30 and 32 of those forward tube assemblies, as depicted in FIG. 6E. It is to be noted that, if necessary, microprocessor controller 62 can energize weight positioning drives 70 and 72 to extend weight 50 out from the forward side of platform 12 to compensate for an improper position of rider RDR (FIG. 5) on platform 12, as indicated in FIG. 6F. Of course, other precautionary devices (not shown) may be provided for optimizing weight distribution on platform 12 during a stair negotiation process. Such precautionary device include alarm and instruction generators for providing visual and/or audible directives to rider RDR. These precautionary devices, as well as weight positioning drives 70 and 72, are activated by microprocessor controller 62 in response to input from load distribution sensors 104 (FIG. 4) including, for instance a plurality of air pressure detectors 106 communicating with tube assemblies 29 for monitoring pressures therein. Load distribution sensors 104 may also include a level monitor 108 attached to platform 12 for detecting any deviation in the orientation of upper surface 14 from a horizontal reference position.

Figure 6G:
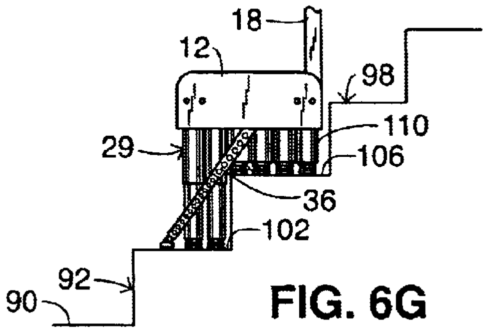

After the extension of the forward set 110 of tube assemblies 29 so that the personal hovercraft or air-cushion vehicle is in the state illustrated in FIG. 6E, microprocessor controller 62 again energizes linear drive(s) 66 to extend legs 36 and 38, as shown in FIG. 6E, to place feet 46 in contact with upper surface 102 of lowermost step 92. At that point, microprocessor controller 62 coordinates an energization of rotary drive(s) 68 and linear drives 56 so that individual rows of tube assemblies 29, starting with a most forward row 110, are successively retracted while legs 36 and 38 tilt forwards, as shown in FIGS. 6F and 6G. In this manner, platform 12 is initially supported by tube assemblies 29 still in operative contact with step surface 102, as well as by legs 36 and 38. As the forward rows of retracted tube assemblies 29 are positioned over an upper surface 106 of second step 96, those tube assemblies may be partially extended, if necessary, to bring the respective resilient skirts 34 into effective contact with the second step's surface 106. The forward tube assemblies, properly pressurized, then bear an increasing amount of the weight of the personal hovercraft and its load. Several rows 111 of tube assemblies 29 at the rear end of platform 12 may be depressurized and optionally retracted during the stair climbing process as those tube assemblies do not assist in the stair climbing.

It is to be appreciated that the personal hovercraft or air-cushion vehicle and its attendant load (e.g., rider RDR) are lifted from step to step by linear drives 56 of the forward rows of tube assemblies 29. The action of drives 56 and forward tube assemblies may be assisted by the activation of drive(s) 66 and the concomitant extension of legs 36 and 38.

Figure 7A:
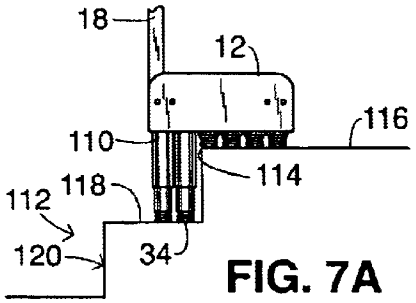
FIGS. 7A through 7E are diagrammatic partial side elevational views of the personal hovercraft vehicle of FIGS. 1–3, showing successive steps in a stair descending process in accordance with the present invention.
Figure 7B:
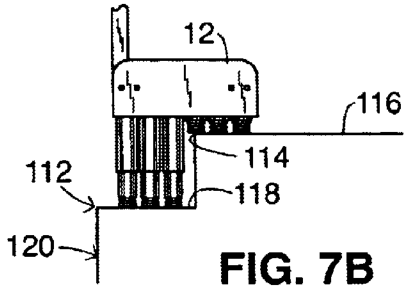

The principles applied in having the personal hovercraft or air-cushion vehicle climb stairway 94 are also applied in having the hovercraft or vehicle descend a stairway 112, shown in FIG. 7A. As the forward end of platform 12 is moved over an edge or lip 114 of an upper floor surface 116, microprocessor controller 62 (in response to signals from sensors 28) sequentially activates linear drives 56 of individual rows of tube assemblies 29, starting with the most forward row 110, to extend the tube assemblies so that the skirts 34 are in effective contact with a surface 118 of a first step 120, as shown in FIGS. 7A and 7B. When a clearance for legs 36 and 38 is attained, microprocessor controller 62 activates drives 66 and 68 to extend legs 36 and 38 at an oblique angle so that feet 46 are placed into contact with step surface 118, as shown in FIG. 6C.

As illustrated in FIG. 7B, a weight 122 similar to counterbalance weight 50 may be attached to frame or platform 12 at a rear side thereof, to assist in automatically compensating for shifts in the center of gravity of the personal hovercraft or air-cushion vehicle owing to movements of the load (e.g., rider) during descent of stairway 112 by the personal hovercraft or air-cushion vehicle. Rear counterbalance weight 122 is also mounted, to a pivotably mounted rod or telescoping tube 124 so that the moment arm of the weight may be varied. Microprocessor controller 62 positions rear counterbalance weight 122 in response to signals from load distribution sensors 104, as discussed above.

Figure 7C:
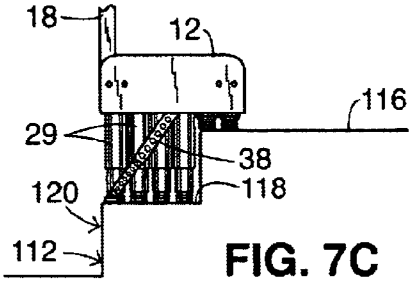
Figure 7D:
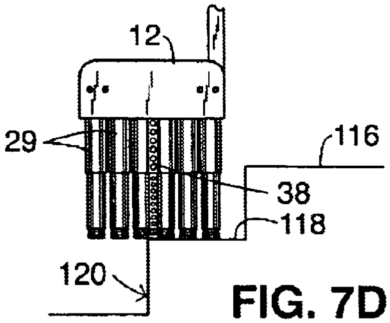
Figure 7E:
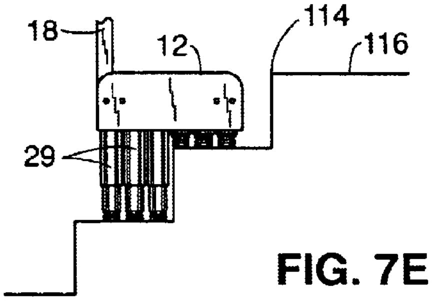
Figure 7F:
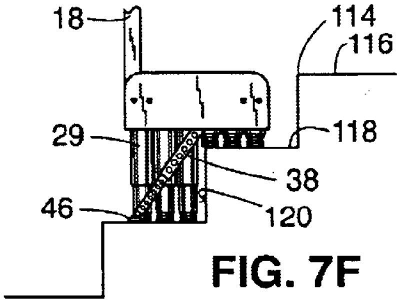

After the oblique extension of legs 36 and 38 and the contact of feet 46 with surface 118 of step 120 (FIG. 7C), microprocessor controller 62 activates drives 66 and 68 to shift platform 12 so that rear set 111 of tube assemblies 29 moves over upper step 120, while forward set 110 of tube assemblies 29 is positioned over a next lower step 126, as shown in FIG. 7D. Microprocessor controller 62 then actuates drives 56 and 66 to lower platform 12 to a level of step surface 118, as shown in FIG. 7E. During this lowering, legs 36 and 38 are retracted into the body of platform 12. Subsequently, microprocessor controller 62 activates drives 66 and 68 to again extend legs 36 and 38 at an oblique angle so that feet 46 are placed into contact with a surface 128 of step 126, as shown in FIG. 6F. The steps described above with reference to FIGS. 7C–7E are then repeated. The deposition of platform on a lower floor surface is a straightforward continuation of the above-described technique.

Although the invention has been described in terms of particular embodiments and applications, one of ordinary skill in the art, in light of this teaching, can generate additional embodiments and modifications without departing from the spirit of or exceeding the scope of the claimed invention. One skilled in the art can vary the numbers and cross-sectional shapes of tube assemblies 29, as well as the number of tubular elements 30, 32 in each tube assembly 29. More than one pair of legs 36 and 38 may be provided, at the same or different locations on platform 12. Accordingly, it is to be understood that the drawings and descriptions herein are proffered by way of example to facilitate comprehension of the invention and should not be construed to limit the scope thereof.

What is claimed is:

1. A personal transportation apparatus comprising:

a frame defining a surface for supporting a load;

a plurality of air-cushion cells mounted to said frame and depending from a lower side thereof, said air-cushion cells each having a changeable height to accommodate variations in an underlying terrain during a translation of said frame over the terrain;

a pressure source mounted to said frame and operatively connected to said air-cushion cells for supplying air under pressure to said cells, thereby generating an air-cushion support for said frame; and an elevation mechanism different from all air-cushion cells mounted to said frame, said elevation mechanism being mounted to said frame for lifting said frame to ascend said stairway from a lowermost step to an uppermost step of said stairway, wherein said elevation mechanism includes at least two extensible leg members and at least one drive operatively connected to said leg members for alternately lengthening and shortening said leg members multiple times during the ascent of said stairway.

2. The personal transportation apparatus according to claim 1 wherein said leg members are mounted to said lower side of said frame.

3. The personal transportation apparatus according to claim 2 wherein said leg members are pivotably mounted to said lower side of said frame.

4. The personal transportation apparatus according to claim 3 wherein said elevation mechanism further includes:

sensors mounted to said frame for monitoring a distance of said frame from an underlying surface; and a control unit operatively connected to said sensors and said drive for operating said drive in response to detection of said step by said sensors.

5. The personal transportation apparatus according to claim 4 wherein said sensors include a plurality of ultrasonic sensors, said elevation mechanism further including an ultrasonic signal generator mounted to said frame for producing an airborne ultrasonic wave and directing said wave towards the underlying surface.

6. The personal transportation apparatus according to claim 3 wherein said extensible leg members are a first pair of leg members, said elevation mechanism including at least one second pair of extensible leg members mounted to said frame on said lower side thereof, for supporting said frame on said next higher step upon a lifting of said frame from said one step to over said next higher step by said first pair of leg members.

7. The personal transportation apparatus according to claim 1 wherein said air-cushion cells include respective rigid telescoping tubes extendible to varying distances from said lower side of said frame, further comprising a drive operatively connected to said tubes for alternately extending and retracting said tubes.

8. The personal transportation apparatus according to claim 7 wherein said tubes are each provided at a lower end with a resilient skirt serving as a flexible seal member.

9. The personal transportation apparatus according to claim 1 wherein said elevation mechanism includes a pneumatic drive, said pressure source being operatively connected to said drive for operating same.

* * * * *